(12) United States Patent
Guisset

(10) Patent No.: US 9,782,040 B2
(45) Date of Patent: Oct. 10, 2017

(54) VERTICAL RACK FOR COOKING WHOLE FISH IN OVEN

(71) Applicant: Fabrice Hans Francois Guisset, San Jose del Cabo (MX)

(72) Inventor: Fabrice Hans Francois Guisset, San Jose del Cabo (MX)

(*) Notice: Subject to any disclaimer, the term of this patent is extended or adjusted under 35 U.S.C. 154(b) by 247 days.

(21) Appl. No.: 14/486,357

(22) Filed: Sep. 15, 2014

(65) Prior Publication Data

US 2016/0022092 A1 Jan. 28, 2016

(30) Foreign Application Priority Data

Jun. 27, 2014 (MX) .................. MX/u/2014/000308

(51) Int. Cl.
| | | |
|---|---|---|
| A22C 7/00 | (2006.01) |
| A23P 1/00 | (2006.01) |
| A47J 43/18 | (2006.01) |
| A47J 37/06 | (2006.01) |

(52) U.S. Cl.
CPC ....... *A47J 37/0694* (2013.01); *A47J 37/0688* (2013.01)

(58) Field of Classification Search
CPC .... A47J 37/0694; A47J 37/041; A47J 37/049; A47J 37/0688; A47J 2037/0795
USPC .......... 99/416, 426, 441, 445, 448; D7/354, D7/409, 504
See application file for complete search history.

(56) References Cited

U.S. PATENT DOCUMENTS

| | | | | |
|---|---|---|---|---|
| 691,833 | A * | 1/1902 | Williamson | A47J 37/0694 248/176.1 |
| 2,360,026 | A * | 10/1944 | Wall | A47J 37/0694 126/337 R |
| 2,584,295 | A * | 2/1952 | Sanzenbacher | A47J 43/18 248/346.01 |
| 3,405,631 | A * | 10/1968 | Thomas, Jr. | A47J 37/0694 99/426 |
| 3,915,309 | A * | 10/1975 | Brazdo | A47J 37/0871 211/11 |
| 4,427,706 | A * | 1/1984 | El-Hag | A23L 1/0128 426/243 |
| D309,365 | S * | 7/1990 | Keene | D1/105 |
| 6,386,096 | B1 * | 5/2002 | Tiemann | A47J 37/0694 211/181.1 |
| D470,360 | S * | 2/2003 | Stanco | 211/85.4 |
| 7,004,064 | B1 * | 2/2006 | Turner | A47J 43/18 99/446 |
| D699,505 | S * | 2/2014 | Kadva | D7/354 |
| D702,501 | S * | 4/2014 | Hand | D7/354 |
| 9,186,021 | B1 * | 11/2015 | Dover | A47J 37/1295 |
| 2007/0110866 | A1 * | 5/2007 | Rubel | A47J 37/1295 426/523 |
| 2011/0088565 | A1 * | 4/2011 | Glas | A47J 43/18 99/421 H |

* cited by examiner

*Primary Examiner* — Dana Ross
*Assistant Examiner* — Lindsay C Staubach
(74) *Attorney, Agent, or Firm* — Sandra P. Thompson; Slater Hersey & Lieberman

(57) ABSTRACT

A vertical grating for cooking whole fish in an oven is disclosed herein that includes a base in isosceles trapezoid shaped form, which has columns set to hold the whole fish in such a way that it is suspended and allowing for the cooking of fish on both sides so that the skin is crisp, wherein the grating may be used to present the fish to the fish eater and facilitating their consumption.

5 Claims, 4 Drawing Sheets

FIG. 6
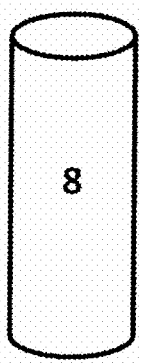
FIG. 7
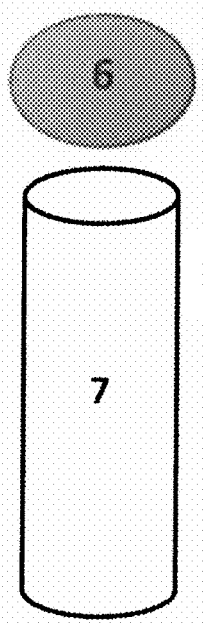
FIG. 8
FIG. 9
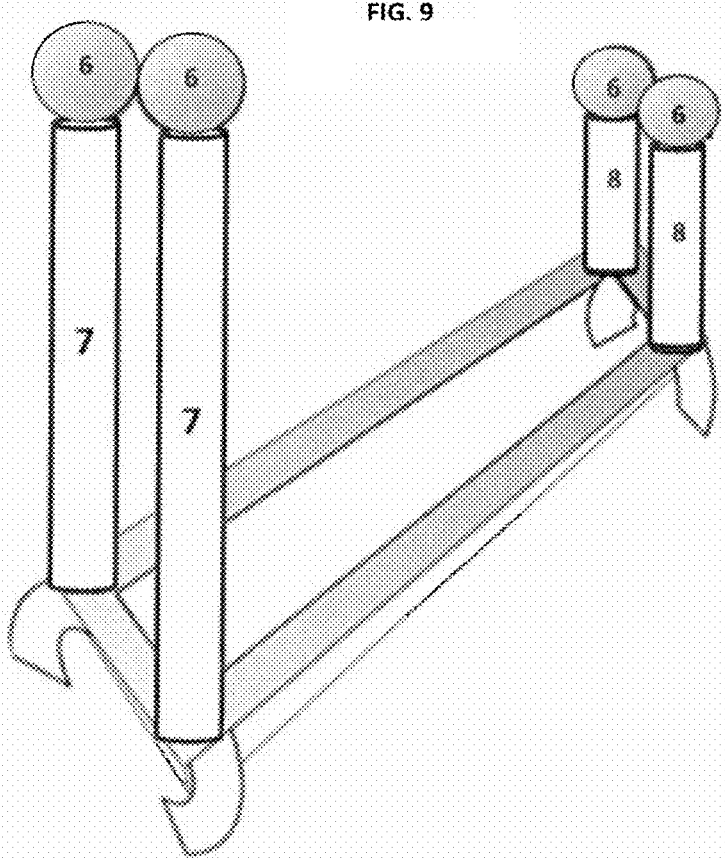

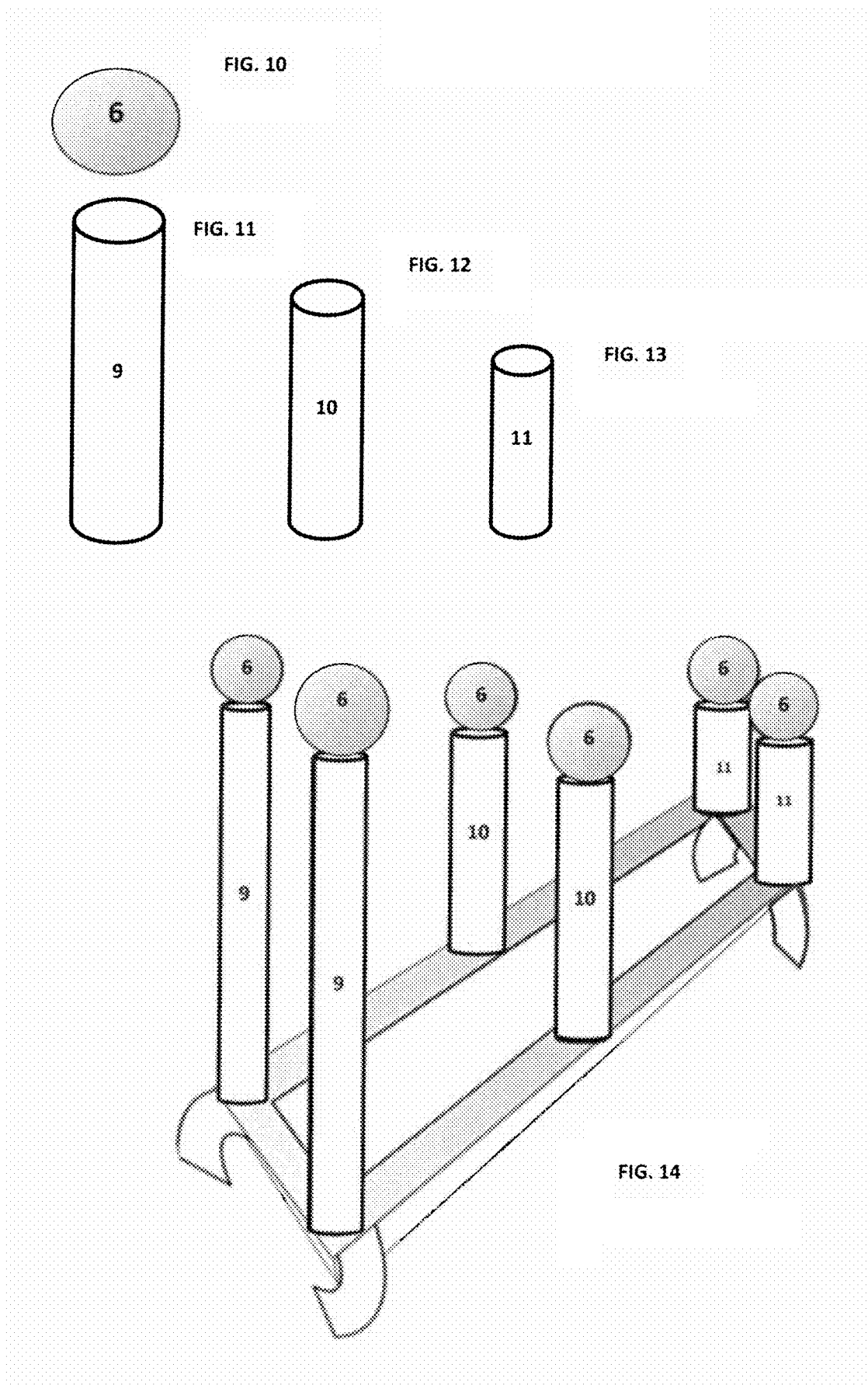

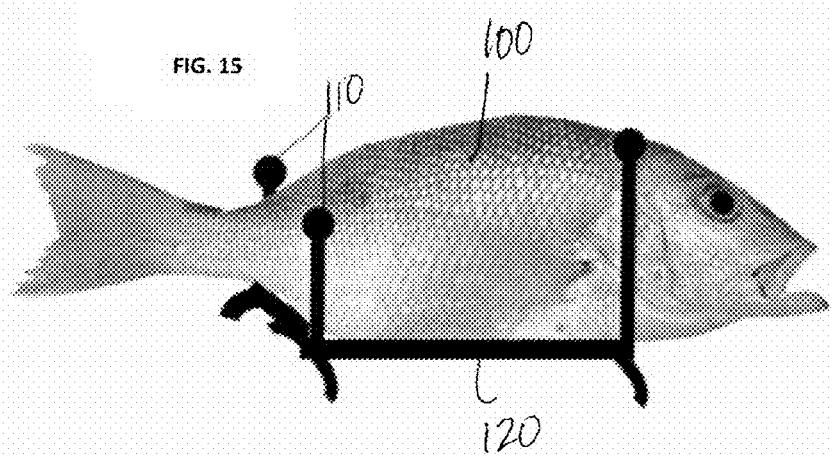
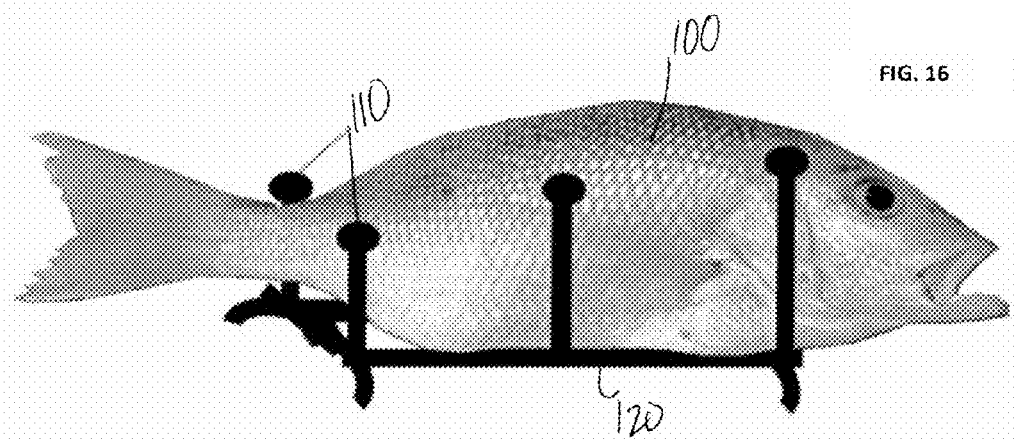

VERTICAL RACK FOR COOKING WHOLE FISH IN OVEN

This United States Utility Application claims priority to Mexican Patent Application Number MX/u/2014/000308 and Sheet MX/E/2014/044509 filed on Jul. 27, 2014, which is commonly-owned and incorporated herein in its entirety by reference.

FIELD OF THE SUBJECT MATTER

The subject matter relates to a vertical grating, through which you can get a better cooking of a whole fish in a conventional oven or stove, leaving the skin crispy and golden on both sides, even without having to turn it over. It can also be presented on the same basis, so that diners can handle the fish with both ease and comfort.

The vertical grille for cooking whole fish in the oven is a tool that can be used by both professionals as well as conventional people.

BACKGROUND

Within the culinary field, cooking of the fish can be very varied, from cooking in water either boiled, poached or in a broth. Cooking in fat through frying, sautéing or stir-frying: cooking mixed as a casserole or stew. Using a steamer-like bath and greased paper. As dry, we have roasted grilled, broiled and baked.

For present purposes, we will refer especially to cooking the fish dry, which can be grilled, broiled or over hot coals, which requires you to be very attentive to it once it is cooking. It should be turned and the grill greased which should also be very clean so the fish does not stick and break.

While baking, the fish is placed on a flat tray or baking dish depending on the size, and should be chopped for better cooking.

Here is where we find the problem for the perfect cooking of the whole fish (from one to two kilograms) dry (especially in conventional or charcoal oven): (i) if done on a flat surface, to prevent the bottom from sticking to the pan and receiving the fish juices and becoming soft and watery, (ii) avoid the risk of breakage when rolling it over, (iii) if it is cooked on a grill over hot coals or a grill, or even baked, to decrease or even avoid the use of extra fat to prevent sticking to the surface on which it lies, (iv) to be able to cook the fish (from one to two kilograms) in whole and not in pieces, (v) achieve a better presentation for the diner.

Among the solutions that have been raised for the types of dry cooking, we found the existing tools, as mentioned, are trays or conventional baking pans. And as stated above, they do not achieve the perfect cooking on both sides of the fish.

There are also square, rectangular and fish-shaped forms which hold the fish between the two parts of the grills, making a press shape, and are used for cooking on coals or grills, facilitating the turning over and cooking of the fish whole, but without being able to be used in a conventional or wood-fired oven because they are not made of ideal materials for it. And in the case of using a furnace, they would have to rely on some base to support the grating with the fish and so these types do not entirely resolve the problem.

There exist specialized cooking ovens just for fish; however, that means it requires specialized fish cooking equipment while a tool like the vertical grating for cooking a fish whole being proposed here is more accessible to those who specialize in the culinary arts, the restaurant industry, and housewives and which can be used in any oven. There are vertical grills on the market with the measurements and form to cook other meats like chicken, ribs, pork and lamb, but there does not exist one for cooking a whole baked fish. Therefore, there is a need for new cooking and baking for cooking fish that addresses all of the problems and challenges addressed herein.

SUMMARY OF THE SUBJECT MATTER

A vertical grating for cooking whole fish in an oven is disclosed herein that includes a base in isosceles trapezoid shaped form, which has columns set to hold the whole fish in such a way that it is suspended and allowing for the cooking of fish on both sides so that the skin is crisp, wherein the grating may be used to present the fish to the fish eater and facilitating their consumption.

Figure 3:
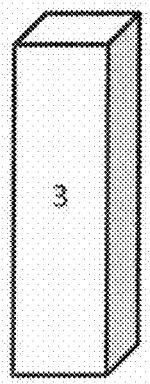
Figure 4:
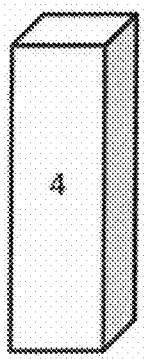

The side bars are the same size (FIG. 2) and are those that correspond to the length of the fish. The bar that goes on the front of the base is slightly wider (shown in FIG. 3), than the final rung of the base corresponding to the tail of the fish which is the shortest of the bars (FIG. 4).

Figure 5:

The base is supported by four semicircular legs, as shown in FIG. 5.

In FIGS. 6 through 9 the composition of the grating is displayed in the form of a small whole fish. FIG. 9 shows the perspective grating in the form of a small whole fish and FIG. 15 is a side view of the placement of the small fish on the grating.

In the form of small whole fish, grating is composed of the base as described above (FIG. 1) and four columns attached thereto. The front columns (FIG. 7) are longer to support the head of the fish, while the final columns (FIG. 8) are shorter. Each of the columns carries a rustic hemispherical ball tip (FIG. 6). On the basis of the shortest (8) to the final part, as illustrated in FIG. 9, longer columns (7) on the front and fixed.

In FIGS. 10 through 14 the composition of the grating is displayed in the form of a large whole fish. FIG. 14 shows in perspective grating in the form of small whole fish and in FIG. 16 there is a side view of the placement of the large fish in grating view.

The grating in the form of large fish comprises in some embodiments and consists of in other embodiments, the base already described above (FIG. 1) and six columns attached to the base. The front columns (FIG. 11) are longer because they hold the head of the fish while the intermediate columns (FIG. 12) are the ones that hold the body of the fish and the final columns (FIG. 13) are shorter than the previous. Each of the columns carries a rustic hemispherical ball tip (FIG. 10).

At the base, the 6 columns unite (FIG. 14). Longer columns (FIG. 11) are placed as shown in the front columns (9) of FIG. 14. Immediately are the intermediate columns (FIG. 12) positioned as illustrated by those listed with 10 in FIG. 14 and, finally, the shorter columns (FIG. 13) are positioned as shown by numeral 11 of FIG. 14.

The fish, in any of the forms, will be placed between each pair of columns (FIGS. 15 and 16), being suspended for their best cooking on both sides.

DETAILED DESCRIPTION

This cooking instrument seeks to deal with the previously posed problem that exists for cooking whole fish in the oven, and which has not been resolved by any other existing instruments. In addition, contemplated embodiments provide an advantage that these other existing instruments do not have, and it is that the base, in addition to being an instrument for cooking a fish in the oven, is also a base for presentation to the diner which offers a clean and easy dining process.

As well, contemplated embodiments comprise a heat-resistant metal that comprises in some embodiments and consists of in other embodiments a base in the form of an isosceles trapezoid with columns attached to the base which will sustain the fish lengthwise. There are two types of contemplated gratings, depending on the size of the fish: one grating for a small whole fish, weighing between 1 kg (a kilo) and 1.5 kg. (a kilo and a half), comprising or consisting of 4 (four) columns. And the second grating for a whole large fish, with a weight between 2 kg (two kilograms) and 2.5 (two kilograms and a half), with 6 (six) columns.

In order to give greater clarity to the description of the instrument for which protection is being claimed, we will describe each mode, even though both harbor the same principle, performance and objective: to bake whole fish properly in a suspended position, as well as to facilitate its presentation and consumption, applying it in the restaurant industry, hotel industry, and coastal places as well as for general domestic use.

The grating mode for small fish comprises in some embodiments and consists of in other embodiments, a base and columns of a sturdy heat-resistant metal that adjusts to the length of a fish weighing between one kilogram and kilo and a half. The base rests on four semicircular legs of the same size and height. The base is made in the shape of an isosceles trapezoid where the front part of the base is one centimeter wider than the end where you will find the tail fin. It has four cylindrical poles or columns. The columns in front are three centimeters longer than the columns at the back of the base since longer columns will hold the head of the fish and the shorter columns the tail fin. Each column is fixed on a corner of the base. At the corners of the widest part of the base can be found the longest columns and at the corners of the narrowest part of the base the shorter columns. In turn, each column has at its endpoint both a rustic and hemispherical protective covering.

The big fish grill mode or larger grating comprises in some embodiments and consists of in other embodiments, a base and six columns of a sturdy heat-resistant metal that adjusts to the length of a fish weighing between two and two and half kilograms. The base rests on four semicircular legs of the same size and height. The base is made in the shape of an isosceles trapezoid where the front part of the base is two centimeters wider than the bottom, where you will find the tail fin. In this mode, the base has six cylindrical poles or columns. Between each pair of columns the height varies by two centimeters, that is, the shorter ones are behind, in the middle are two centimeters longer than the rear ones and front columns are two centimeters longer than the middle ones. The front columns will hold the head of the fish, the middle ones the body and the shorter columns the tail fin.

The longer columns, i.e. the front, are set on each of the corners of the widest part of the base. Medium-sized columns are set on each side, halfway along the base. And finally, the shorter columns, i.e. the rear, are set on each of the corners of the narrowest part of the base. In turn each post has a rustic hemispherical protective cover at the tip.

The fish will be placed raw on the rack, placing the head between the longest columns and widest parts of the base, while the tail fin is placed on the narrowest part of the base and will be held between the shorter columns. For the modality of a large fish, the body of the fish will lie between the columns in the middle of the sides of the base. In this way, the fish gets placed in a suspended position without leaning against either of its sides. The base grille will be placed over the tray to recover the cooking juices and then placed in the oven.

Unlike known conventional cooking instruments, with this instrument, it is possible to bake a whole fish on both sides without the need to turn it over. It is also not necessary to add any fat to prevent sticking and thus prepared in a much healthier way. At the end of cooking, the skin becomes uniformly crisp and golden instead, unlike in a flat tray where one side gets stuck to the pan and receives all the juices and, instead, winds up soft and watery.

The already cooked fish is then removed from the recovery tray juices, and while still on the rack, is placed on the serving dish to present to the diner. With this presentation, the diner can more easily access the flesh of the fish because the skeleton remains right in the middle while firmly held at its extremities; the thorns are centered thus freeing the meat and allowing for two diners to eat the fish at the same time, one from each end. So far, the common way of presenting the already cooked fish is on a plate, but upon eating it, especially when we get to the part below the fish, that the meat has begun to mix with the thorns and turns it into a more complicated meal to eat.

On FIGS. 1 through 4 the base is shown in each of its forms. That is to say, that it has the same form, only that it will adjust in width and length according to the size of the fish. In other words, it will be long and wide in the form of large whole fish (fish weighing 2 to 2.5 kg) and more narrow and short according to a small whole fish (fish weighing between 1-1.5 kg).

Figure 1:
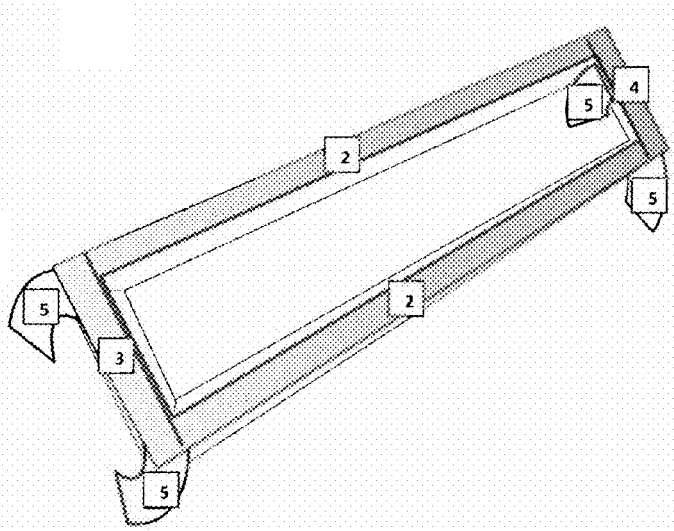
FIG. 1 shows, in perspective, the base of the grille that is isosceles trapezium shaped in all its forms. It has a grill base and its edges are a few bars (as shown in FIGS. 2, 3 and 4).
Figure 2:
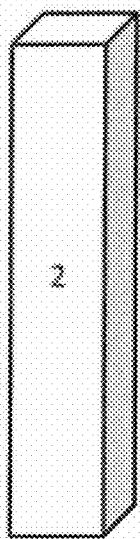

FIG. 1 shows, in perspective, the base of the grille that is isosceles trapezium shaped in all its forms. It has an grill base and its edges are a few bars (FIGS. 2, 3 and 4). The side bars are the same size (FIG. 2) and are those that correspond to the length of the fish. The bar that goes on the front of the base is slightly wider (shown in FIG. 3), than the final rung of the base corresponding to the tail of the fish which is the shortest of the bars (FIG. 4).

The base is supported by four semicircular legs (FIG. 5). We can see in FIG. 1 as they are fixed parts (FIGS. 2, 3, 4 and 5) that make up the base.

In FIGS. 6 through 9 the composition of the grating is displayed in the form of a small whole fish. FIG. 9 shows the perspective grating in the form of a small whole fish and FIG. 15 is a side view of the placement of the small fish on the grating.

In the form of small whole fish, grating is composed of the base as described above (FIG. 1) and four columns attached thereto. The front columns (FIG. 7) are longer to support the head of the fish, while the final columns (FIG. 8) are shorter. Each of the columns carries a rustic hemispherical ball tip (FIG. 6). On the basis of the shortest (8) to the final part, as illustrated in FIG. 9, longer columns (7) on the front and fixed.

In FIGS. 10 through 14 the composition of the grating is displayed in the form of a large whole fish. FIG. 14 shows in perspective grating in the form of small whole fish and in FIG. 16 there is a side view of the placement of the large fish in grating view.

The grating in the form of large fish consists of the base already described above (FIG. 1) and six columns attached to the base. The front columns (FIG. 11) are longer because they hold the head of the fish while the intermediate columns (FIG. 12) are the ones that hold the body of the fish and the final columns (FIG. 13) are shorter than the previous. Each of the columns carries a rustic hemispherical ball tip (FIG. 10).

At the base, the 6 columns unite (FIG. 14). Longer columns (FIG. 11) are placed as shown in the front columns (9) of FIG. 14. Immediately are the intermediate columns (FIG. 12) positioned as illustrated by those listed with 10 in FIG. 14 and, finally, the shorter columns (FIG. 13) are positioned as shown by numeral 11 of FIG. 14.

The fish 100, in any of the forms, will be placed between each pair of columns 110 and on the base 120 (FIGS. 15 and 16), being suspended for their best cooking on both sides.

The invention claimed is:

1. A vertical grating for cooking whole fish in an oven, comprising:
    a base having an isosceles trapezoid-shaped form, wherein the base comprises two side bars, a front base bar and a final rung bar, and wherein the front base bar is wider than the final rung bar;
    two front columns that are coupled with the front base bar;
    two final columns that are coupled with the final rung bar, wherein the at least two front columns are longer than the at least two final columns; and
    wherein a fish can be positioned lengthwise between each of the two front columns and between each of the two final columns for cooking, such that the head of the fish is supported by the front base bar and the tail of the fish is supported by the final rung bar.

2. The vertical grating of claim 1, further comprising two intermediate columns, wherein each intermediate column is coupled with one side bar.

3. The vertical grating of claim 2, wherein each intermediate column is longer than one of the final columns and is shorter than one of the front columns.

4. The vertical grating of claim 1, wherein each of the front two columns and each of the two final columns comprises a rustic hemispherical ball tip.

5. The vertical grating of claim 2, wherein each of the intermediate columns comprises a rustic hemispherical ball tip.

* * * * *